(12) United States Patent
Park et al.

(10) Patent No.: US 12,234,375 B2
(45) Date of Patent: Feb. 25, 2025

(54) SILICONE-BASED COATING COMPOSITION AND SILICONE-BASED RELEASE FILM COMPRISING SAME

(71) Applicant: LG Chem, Ltd., Seoul (KR)

(72) Inventors: Jun Hyoung Park, Daejeon (KR); Jun Beom Park, Daejeon (KR); Jihye Jung, Daejeon (KR); Kwang Su Seo, Daejeon (KR)

(73) Assignee: LG Chem, Ltd., Seoul (KR)

( * ) Notice: Subject to any disclaimer, the term of this patent is extended or adjusted under 35 U.S.C. 154(b) by 241 days.

(21) Appl. No.: 17/797,605

(22) PCT Filed: Aug. 26, 2021

(86) PCT No.: PCT/KR2021/011406
§ 371 (c)(1),
(2) Date: Aug. 4, 2022

(87) PCT Pub. No.: WO2022/045785
PCT Pub. Date: Mar. 3, 2022

(65) Prior Publication Data
US 2023/0094474 A1    Mar. 30, 2023

(30) Foreign Application Priority Data

Aug. 31, 2020 (KR) .......... 10-2020-0110321

(51) Int. Cl.
*C09D 183/04* (2006.01)
(52) U.S. Cl.
CPC ................... *C09D 183/04* (2013.01)
(58) Field of Classification Search
CPC .................................................. C09D 183/04
See application file for complete search history.

(56) References Cited

U.S. PATENT DOCUMENTS

| | | | |
|---|---|---|---|
| 8,609,239 B2 | 12/2013 | Ijima et al. | |
| 2003/0072932 A1 | 4/2003 | Gandon | |
| 2008/0038669 A1* | 2/2008 | Kakino | G03G 17/04 430/37 |
| 2013/0224416 A1 | 8/2013 | Cho et al. | |
| 2013/0302526 A1* | 11/2013 | Fish | C09D 183/14 252/62 |
| 2014/0360367 A1 | 12/2014 | Ahn et al. | |
| 2017/0233612 A1 | 8/2017 | Han et al. | |
| 2017/0298251 A1* | 10/2017 | Park | C09D 7/65 |
| 2021/0179888 A1 | 6/2021 | Rummel et al. | |
| 2021/0317353 A1 | 10/2021 | Kuroda | |

FOREIGN PATENT DOCUMENTS

| | | |
|---|---|---|
| CN | 1872927 A | 12/2006 |
| CN | 104169334 A | 11/2014 |
| CN | 107429126 A | 12/2017 |
| CN | 111225960 A | 6/2020 |
| JP | 2008265227 A | 11/2008 |
| JP | 2018193463 A | 12/2018 |
| JP | 6642740 B2 | 2/2020 |
| KR | 100377243 B1 | 3/2003 |
| KR | 100530518 B1 | 2/2006 |
| KR | 100708434 B1 | 4/2007 |
| KR | 101095295 B1 | 12/2011 |
| KR | 20120050136 A | 5/2012 |
| KR | 101955241 B1 | 3/2019 |
| KR | 101989905 B1 | 6/2019 |
| WO | 2020026844 A1 | 2/2020 |

OTHER PUBLICATIONS

International Search Report for Application No. PCT/KR2021/011406 mailed Dec. 23, 2021, pp. 1-3.

* cited by examiner

*Primary Examiner* — Alicia J Weydemeyer
*Assistant Examiner* — Laura B Figg
(74) *Attorney, Agent, or Firm* — Lerner David LLP

(57) ABSTRACT

The present disclosure relates to a silicone-based coating composition, and a silicone-based release film including the same, wherein the silicone-based coating composition comprises a silicone-based compound represented by the following Chemical Formula 1 having a weight average molecular weight of greater than or equal to 25,000 g/mol and less than or equal to 70,000 g/mol:

[Chemical Formula 1]

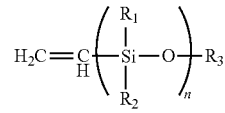

wherein $R_1$ to $R_3$ and n are described herein.

15 Claims, No Drawings

SILICONE-BASED COATING COMPOSITION AND SILICONE-BASED RELEASE FILM COMPRISING SAME

CROSS-REFERENCE TO RELATED APPLICATIONS

The present application is a national stage entry under 35 U.S.C. § 371 of International Application No. PCT/KR2021/011406 filed on Aug. 26, 2021, which claims priority from Korean Patent Application No. 10-2020-0110321 filed on Aug. 31, 2020, all the disclosures of which are incorporated herein by reference.

TECHNICAL FIELD

The present specification relates to a silicone-based coating composition, and a silicone-based release film including the same.

BACKGROUND ART

A release film is mainly used for protecting an adhesive, as a carrier, as a coating base, and the like.

From the structural aspect, a release film has a structure in which a coating solution capable of providing a release property is coated on a base film such as a polyethylene terephthalate (PET) film, paper, polypropylene (PP) and polyvinyl chloride (PVC).

One of main roles of such a release film is a role of an adhesive carrier, which is transported to a place where needed and removed properly.

As for an adhesive used for IT, the adhesive becomes softer in order to maximize an ability to fill a difference, and accordingly, release peel strength, a force required to remove a release film, becomes heavy.

A problem with this is that a process of removing a release film is an automated process, and a force to remove the release film is set appropriately.

However, with softening of an adhesive, a release film is difficult to remove, and needs for an ultralight peel release film have been rising.

PRIOR ART DOCUMENTS

Patent Documents

Korean Patent No. 10-0377243

DISCLOSURE

Technical Problem

The present disclosure is directed to providing a silicone-based coating composition that is, by including a silicone-based compound including a monovinyl structure at the end, free from silicone transfer and blocking problems by lowering crosslink density of a coating layer and thereby maximizing flexibility of the coating layer and lowering release peel strength.

The present disclosure is directed to providing a silicone-based release film including a coating layer, a cured material of the silicone-based coating composition.

However, problems that the present disclosure is to resolve are not limited to the problems mentioned above, and other problems that are not mentioned will be clearly understood by those skilled in the art from the following descriptions.

Technical Solution

One embodiment of the present disclosure provides a silicone-based coating composition including a silicone-based resin, a silicone-based crosslinking agent and a metal catalyst, and further including a silicone-based compound represented by the following Chemical Formula 1 having a weight average molecular weight of greater than or equal to 25,000 g/mol and less than or equal to 70,000 g/mol:

[Chemical Formula 1]

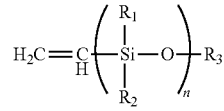

in Chemical Formula 1, $R_1$ to $R_3$ are each independently hydrogen, a substituted or unsubstituted alkyl group or a substituted or unsubstituted cycloalkyl group, and n is an integer of 1 to 15000.

Another embodiment of the present disclosure provides a silicone-based release film including a base layer; and a coating layer that is a cured material of the silicone-based coating composition.

Advantageous Effects

By further including a silicone-based compound including a monovinyl structure at the end, a silicone-based coating composition according to the present disclosure is capable of lowering release peel strength by lowering crosslink density of a coating layer and thereby maximizing flexibility of the coating layer, and accordingly, a silicone-based release film free from silicone transfer and blocking problems can be provided.

A silicone-based release film according to the present disclosure has an advantage of improving properties of an adhesive compared to existing ultralight peel release products.

Effects of the present disclosure are not limited to the above-described effects, and effects that are not mentioned will be clearly understood by those skilled in the art from the specification and accompanying drawings of the present application.

MODE FOR DISCLOSURE

Hereinafter, the present disclosure will be described in more detail to illuminate the present disclosure.

A silicone-based coating composition according to the present disclosure and a silicone-based release film including the same will be described hereinafter, however, unless specified otherwise, technical terms and scientific terms used herein have meanings that those having common knowledge in the art commonly understand, and in the following descriptions, descriptions on known functions and constitutions that may unnecessarily obscure the gist of the present disclosure will not be included.

Terms used in the present specification are defined as follows.

Throughout the specification of the present application, a description of a certain part "including" certain constituents means capable of further including other constituents, and does not exclude other constituents unless particularly stated on the contrary.

Throughout the specification of the present application, a description of one member being placed "on" another member includes not only a case of the one member being in contact with the another member but a case of still another member being present between the two members.

Throughout the specification of the present application, "parts by weight" may mean a weight ratio between each component.

Throughout the specification of the present application, "one or more" means, for example, "1, 2, 3, 4 or 5, particularly 1, 2, 3 or 4, more particularly 1, 2 or 3, and even more particularly 1 or 2".

Throughout the specification of the present application, a weight average molecular weight (Mw), a number average molecular weight (Mn) and a Z average molecular weight (Mz+1) are numbers converted with respect to standard polystyrene measured using gel permeation chromatography (GPC, manufactured by Waters). However, the weight average molecular weight (Mw), the number average molecular weight (Mn) and the Z average molecular weight (Mz+1) are not limited thereto, and may be measured using other methods known in the art.

Throughout the specification of the present application, release peel strength of a coating layer may mean an average force applied to peel the coating layer measured according to a peel angle of 180° and a peel rate of 0.3 m/min using a measurement device (Cheminstruments, Inc./AR-1000) after attaching the coating layer to a Tesa7475 standard adhesive tape by pressing back and forth 3 times with a load of 2 kg, storing for a set time (1 day) at a set temperature (70° C.). Herein, Final Test Method No. 10 may be used as the measurement standard.

Throughout the specification of the present application, two standard tapes are prepared for evaluating a residual adhesive rate of a coating layer. One of the standard tapes is attached to a SUS plate. The other standard tape is attached to a silicone-based release film of each of examples and comparative examples, removed after storing for 20 hours, and the removed standard tape is attached to the SUS plate. Peel strength of each of the standard tapes attached to the SUS plate is measured, and from a ratio (%) of the peel strength of the standard tape attached to the SUS plate after attached to the release film of each of examples and comparative examples with respect to the peel strength of the standard tape attached directly to the SUS plate without any treatment, a residual adhesive rate is evaluated.

Throughout the specification of the present application, adhesion to a base of a coating layer means measuring a period of time when the coating layer is eliminated after a release film is left unattended by a certain period of time at room temperature (20° C., 40% RH), and then the corresponding release film goes back and forth three times in a friction resistance tester with toluene, an organic solvent, applied on a gauze.

Throughout the specification of the present application, "substituted or unsubstituted" means being substituted with one or more substituents selected from the group consisting of deuterium; a halogen group; a cyano group; a nitrile group; a nitro group; a hydroxyl group; a carbonyl group; an ester group; an imide group; an amino group; a phosphine oxide group; an alkoxy group; a cycloalkoxy group; an aryloxy group; a heterocyclyloxy group; an alkylthioxy group; an arylthioxy group; an alkylsulfoxy group; an arylsulfoxy group; a silyl group; a carbosilyl group; a boron group; an alkyl group; a cycloalkyl group; an alkenyl group; an alkynyl group; an aryl group; an aralkyl group; an aralkenyl group; an alkylaryl group; an alkylamine group; an aralkylamine group; a heteroarylamine group; an arylamine group; an arylphosphine group; or a heteroaryl including one or more of N, O and S atoms, or being substituted with a substituent linking two or more substituents among the substituents illustrated above, or being unsubstituted.

Throughout the specification of the present application, the "substituent linking two or more substituents" may be a biphenyl group. In other words, a biphenyl group may be an aryl group, or interpreted as a substituent linking two phenyl groups.

In the present specification, the term "deuterium" refers to a stable isotope of hydrogen having a mass approximately twice that of a most common isotope, that is, a mass of approximately 2 atomic mass units.

Throughout the specification of the present application, the "halogen group" refers to a fluoro (F), a chloro (Cl), a bromo (Br) or an iodo (I) atom.

In the present specification, the term "cyano group" or "nitrile group" means a —C≡N group.

Throughout the specification of the present application, an "isocyanate group" means a —N=C=O group.

Throughout the specification of the present application, the "nitro group" refers to a —NO$_2$ group.

Throughout the specification of the present application, the "hydroxyl group" refers to an —OH group.

Throughout the specification of the present application, the "carbonyl group" means a divalent organic radical represented by —C(=O)—. Specifically, the number of carbon atoms attached to the carbonyl group is not particularly limited, but is preferably from 1 to 40.

Throughout the specification of the present application, the "ester group" refers to a —C(=O)O group. Specifically, in the ester group, oxygen of the ester group may be substituted with a linear, branched or cyclic alkyl group having 1 to 25 carbon atoms or an aryl group having 6 to 25 carbon atoms.

Throughout the specification of the present application, the "ether" means being represented by —R—O—R'. In the ether, R or R' is each independently an alkyl group having 1 to 20 carbon atoms, an aryl group having 6 to 30 carbon atoms, a cycloalkyl group having 3 to 30 carbon atoms, an alkenyl group having 2 to 20 carbon atoms, an alkynyl group having 2 to 20 carbon atoms, or a combination thereof, but is not limited thereto.

Throughout the specification of the present application, the "imide group" means a structure of —C(O)NR$^x$C(O)R$^y$. Specifically, R$^x$ and R$^y$ are each independently hydrogen, or a substituted or unsubstituted alkyl, cycloalkyl, alkenyl, alkynyl, aryl, aralkyl, heterocyclyl or heterocyclylalkyl group as defined in the present specification. Specifically, the number of carbon atoms of the imide group is not particularly limited, but is preferably from 1 to 25. Compounds having structures as below may be specifically included, however, the imide group is not limited thereto.

Throughout the specification of the present application, the "amino group" refers to an —NH$_2$ group.

Throughout the specification of the present application, the "phosphine oxide group" means a structure of —P(=O)R$^x$R$^y$R$^z$.

Throughout the specification of the present application, the "alkoxy group", the "cycloalkoxy group", the "aryloxy group" and the "heterocyclyloxy group" refer to any one of the alkyl, the cycloalkyl, the aryl or the heterocyclyl attached to the rest of the molecule through an oxygen atom (—O—).

Throughout the specification of the present application, the "alkylthioxy group" and the "arylthioxy group" refer to any one of the alkyl or the aryl attached to the rest of the molecule through a sulfur atom (—S—).

Throughout the specification of the present application, the "alkylsulfoxy group" and the "arylsulfoxy group" refer to any one of the alkyl or the aryl attached to the rest of the molecule through —SO.

Throughout the specification of the present application, the "carbosilyl group" means an organic silyl group including carbon, hydrogen and silicon and containing a Si—C bond. Specifically, the number of carbon atoms of the carbosilyl is not particularly limited, but is preferably from 1 to 10, and although the number of silyl is not particularly limited, the number of silyl is preferably from 1 to 10. Specific examples of the carbosilyl group may include, but are not limited to, methylsilyl (—SiMeH$_2$), ethylsilyl (—SiEtH$_2$), diethylsilyl (—SiEt$_2$H), dimethylsilyl (—SiMe$_2$H), triethylsilyl (—SiEt$_3$), trimethylsilyl (—SiMe$_3$), 1,2-dimethyldisilabutyl (—SiMeHSiMeH$_2$), 1,4-disilabutyl (—SiH$_2$CH$_2$CH$_2$SiH$_3$), dimethylvinylsilyl (—SiMe$_2$CH=CH$_2$), phenylsilyl (—SiPhH$_2$) and the like.

Throughout the specification of the present application, the "silyl group" means an unsubstituted (—SiH$_3$) or substituted silyl group.

Specific examples of the silyl group may include a trimethylsilyl group, a triethylsilyl group, a t-butyldimethylsilyl group, a vinyldimethylsilyl group, a propyldimethylsilyl group, a triphenylsilyl group, a diphenylsilyl group, a phenylsilyl group and the like, but are not limited thereto.

Specific examples of the boron group may include a trimethylboron group, a triethylboron group, a t-butyldimethylboron group, a triphenylboron group, a phenylboron group and the like, but are not limited thereto.

Throughout the specification of the present application, the "alkyl group" means linear or branched saturated hydrocarbon. Specifically, the number of carbon atoms of the alkyl group is not particularly limited, but is preferably from 1 to 40. According to one embodiment, the number of carbon atoms of the alkyl group is from 1 to 20. According to another embodiment, the number of carbon atoms of the alkyl group is from 1 to 10. According to another embodiment, the number of carbon atoms of the alkyl group is from 1 to 6. Specific examples of the alkyl group may include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopentylmethyl, cyclohexylmethyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 2-methylpentyl, 4-methylhexyl, 5-methylhexyl and the like, but are not limited thereto.

Throughout the specification of the present application, the "cycloalkyl group" refers to a completely saturated and partially unsaturated hydrocarbon ring of carbon atoms. Specifically, the cycloalkyl group is not particularly limited, but preferably has 3 to 60 carbon atoms, and according to one embodiment, the number of carbon atoms of the cycloalkyl group is from 3 to 30. According to another embodiment, the number of carbon atoms of the cycloalkyl group is from 3 to 20. According to another embodiment, the number of carbon atoms of the cycloalkyl group is from 3 to 6. Specific examples thereof may include cyclopropyl, cyclobutyl, cyclopentyl, 3-methylcyclopentyl, 2,3-dimethylcyclopentyl, cyclohexyl, 3-methylcyclohexyl, 4-methylcyclohexyl, 2,3-dimethylcyclohexyl, 3,4,5-trimethylcyclohexyl, 4-tert-butylcyclohexyl, cycloheptyl, cyclooctyl and the like, but are not limited thereto.

Throughout the specification of the present application, the "alkenyl group" refers to linear or branched unsaturated hydrocarbon including one or more double bonds. Specifically, the alkenyl group may be linear or branched, and although not particularly limited thereto, the number of carbon atoms is preferably from 2 to 40. According to one embodiment, the number of carbon atoms of the alkenyl group is from 2 to 20. According to another embodiment, the number of carbon atoms of the alkenyl group is from 2 to 10. According to another embodiment, the number of carbon atoms of the alkenyl group is from 2 to 6. Specific examples thereof may include vinyl, 1-propenyl, isopropenyl, 1-butenyl, 2-butenyl, 3-butenyl, 1-pentenyl, 2-pentenyl, 3-pentenyl, 3-methyl-1-butenyl, 1,3-butadienyl, allyl, 1-phenylvinyl-1-yl, 2-phenylvinyl-1-yl, 2,2-diphenylvinyl-1-yl, 2-phenyl-2-(naphthyl-1-yl)vinyl-1-yl, 2,2-bis(diphenyl-1-yl)vinyl-1-yl, a stilbenyl group, a styrenyl group and the like, but are not limited thereto.

Throughout the specification of the present application, the "alkynyl group" means a linear or branched unsaturated hydrocarbon radical including one or more triple bonds. Specifically, the alkynyl group may be linear or branched, and although not particularly limited thereto, the number of carbon atoms is preferably from 2 to 40. According to one embodiment, the number of carbon atoms of the alkynyl group is from 2 to 20. According to another embodiment, the number of carbon atoms of the alkynyl group is from 2 to 10. According to another embodiment, the number of carbon atoms of the alkynyl group is from 2 to 6. Specific examples thereof may include short-chain hydrocarbon radicals selected from among ethynyl, prop-1-yn-1-yl, prop-2-yn-1-yl, but-1-yn-1-yl, but-1-yn-3-yl, but-3-yn-1-yl and the like, but are not limited thereto.

Throughout the specification of the present application, the "aryl group" means, as an organic radical derived from aromatic hydrocarbon by removing one hydrogen, a monocyclic or polycyclic aromatic hydrocarbon radical. Specifically, the aryl group is not particularly limited, but preferably has 6 to 60 carbon atoms, and may be a monocyclic aryl group or a polycyclic aryl group. According to one embodiment, the number of carbon atoms of the aryl group is from 6 to 30. According to one embodiment, the number of carbon atoms of the aryl group is from 6 to 20. When the aryl group is a monocyclic aryl group, examples thereof may include a phenyl group, a biphenyl group, a terphenyl group and the like, but are not limited thereto. When the aryl group is a polycyclic aryl group, examples thereof may include a naphthyl group, an anthracenyl group, a phenanthryl group, a pyrenyl group, a perylenyl group, a chrysenyl group, a fluorenyl group and the like, but are not limited thereto.

Throughout the specification of the present application, the "fluorenyl group" means a 9-fluorenyl radical.

Specifically, the fluorenyl group may be substituted, and two substituents may bond to each other to form a spiro structure. When the fluorenyl group is substituted, and the like may be included. However, the structure is not limited thereto.

Throughout the specification of the present application, the "heteroaryl group" means, as an organic radical derived from aromatic hydrocarbon by removing one hydrogen, a heteroaryl including one or more heteroatoms selected from among B, N, O, S, P(=O), Si and P. Specifically, the number of carbon atoms of the heteroaryl group is not particularly limited, but is preferably from 3 to 60. Examples of the heteroaryl group may include a thiophene group, a furan group, a pyrrole group, an imidazole group, a thiazole group, an oxazole group, an oxadiazole group, a triazole group, a pyridyl group, a bipyridyl group, a pyrimidyl group, a triazine group, a triazole group, an acridly group, a pyridazine group, a pyrazinyl group, a quinolinyl group, a quinazoline group, a quinoxalinyl group, a phthalazinyl group, a pyridopyrimidinyl group, a pyridopyrazinyl group, a pyrazinopyrazinyl group, an isoquinoline group, an indole group, a carbazole group, a benzoxazole group, a benzimidazole group, a benzothiazole group, a benzocarbazole group, a benzothiophene group, a dibenzothiophene group, a benzofuranyl group, a phenanthroline group, a thiazolyl group, an isoxazolyl group, an oxadiazolyl group, a thiadiazolyl group, a benzothiazolyl group, a phenothiazinyl group, a dibenzofuranyl group and the like, but are not limited thereto.

Throughout the specification of the present application, the aryl group in the aralkyl group, the aralkenyl group, the alkylaryl group and the arylamine group is the same as the examples of the aryl group described above. In the present specification, the alkyl group in the aralkyl group, the alkylaryl group and the alkylamine group is the same as the examples of the alkyl group described above.

Throughout the specification of the present application, the descriptions on the heteroaryl provided above may be applied to the heteroaryl in the heteroarylamine. In the present specification, the alkenyl group in the aralkenyl group is the same as the examples of the alkenyl group described above. In the present specification, the descriptions on the aryl group provided above may be applied to the arylene except that the arylene is a divalent group. In the present specification, the descriptions on the heteroaryl group provided above may be applied to the heteroarylene except that the heteroarylene is a divalent group. In the present specification, the descriptions on the aryl group or the cycloalkyl group provided above may be applied to the hydrocarbon ring except that the hydrocarbon ring is not a monovalent group and is formed through bonding of two substituents. In the present specification, the descriptions on the heteroaryl provided above may be applied to the heteroring except that the heteroring is not a monovalent group and is formed through bonding of two substituents.

Silicone-Based Coating Composition

One embodiment of the present disclosure provides a silicone-based coating composition including a silicone-based resin, a silicone-based crosslinking agent and a metal catalyst, and further including a silicone-based compound represented by the following Chemical Formula 1 having a weight average molecular weight of greater than or equal to 25,000 g/mol and less than or equal to 70,000 g/mol.

[Chemical Formula 1]

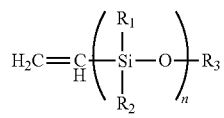

In Chemical Formula 1,
$R_1$ to $R_3$ are each independently hydrogen, a substituted or unsubstituted alkyl group or a substituted or unsubstituted cycloalkyl group, and
n is an integer of 1 to 15000.

A silicone-based coating composition in the art has been developed in order to lower release peel strength by using a silicone-based resin as a main component. Such a silicone-based coating composition in the art has problems in that silicone is transferred to an adhesive or blocking phenomena occur due to a thick coating layer, and since an existing ultralight peel release film is obtained by increasing a thickness of a coating layer or adding a transferable silicone component, there is a big problem of decline in adhesive properties due to silicone transfer.

In order to resolve the problems of an existing silicone-based coating composition, the inventors of the present disclosure have developed a silicone-based coating composition that is, by further including a silicone-based compound including a monovinyl structure at the end, free from silicone transfer and blocking problems by lowering crosslink density of a coating layer and thereby maximizing flexibility of the coating layer and lowering release peel strength, and capable of significantly improving properties of an adhesive, and a silicone-based release film including the same.

In the present specification, the term "silicone-based resin" means a highly crosslinked network-like polymer including one or more silicon (Si) atoms, particularly, one or more SiO groups. Specifically, in the present disclosure, the silicone-based resin may be vinyl terminated polydimethylsiloxane. However, types of the silicone-based resin are not limited to those described above.

According to the present disclosure, the silicone-based resin may have a poly dispersity index (PDI) of 1 to 3. The poly dispersity index is a value obtained by dividing a weight average molecular weight value by a number average molecular weight.

In the present disclosure, a weight average molecular weight (Mw), a number average molecular weight (Mn) and a Z average molecular weight (Mz+1) are numbers converted with respect to standard polystyrene measured using gel permeation chromatography (GPC, manufactured by Waters). However, the weight average molecular weight (Mw), the number average molecular weight (Mn) and the Z average molecular weight (Mz+1) are not limited thereto, and may be measured using other methods known in the art.

According to the present disclosure, the silicone-based resin may have a weight average molecular weight of greater than or equal to 100,000 g/mol and less than or equal to 600,000 g/mol. Specifically, the silicone-based resin may have a weight average molecular weight of greater than or equal to 150,000 g/mol and less than or equal to 550,000 g/mol, greater than or equal to 200,000 g/mol and less than or equal to 500,000 g/mol, or greater than or equal to 250,000 g/mol and less than or equal to 450,000 g/mol. By adjusting the weight average molecular weight of the silicone-based resin to the above-described range, release peel strength of the coating layer including a cured material of the silicone-based coating composition may be obtained at a proper level.

In the present specification, as the "silicone-based crosslinking agent", those used for preparing a release agent composition in the art may be employed without limit. For example, the silicone-based crosslinking agent may be a polyorganohydrogen siloxane having at least two silicon atom-bonding hydrogen atoms in one molecule, and may specifically include at least one of a dimethylhydrogensiloxy group end-capping dimethylsiloxane-methyl hydrogen siloxane copolymer, a trimethylsiloxy group end-capping dimethylsiloxane-methyl hydrogen siloxane copolymer, a trimethylsiloxy group end-capping poly(methyl hydrogen siloxane), poly(hydrogen silesquioxane) and methyl hydrogen siloxane, however, types of the silicone-based crosslinking agent are not limited. In the present disclosure, methyl hydrogen siloxane may be used as the silicone-based crosslinking agent.

According to the present disclosure, as the metal catalyst, those used in the art for preparing a silicone-based coating composition may be employed and used without limit. Specifically, the metal catalyst may at least include a platinum-based catalyst. In addition, the platinum-based catalyst may include at least one of particulate platinum, particulate platinum adsorbed on a carbon powder carrier, chloroplatinic acid, alcohol-modified chloroplatinic acid and an olefin complex of chloroplatinic acid, however, types of the platinum-based catalyst are not limited. In the present disclosure, PL-50T (ShinEtsu Silicone) may be used as the platinum-based catalyst.

According to the present disclosure, the silicone-based coating composition may have a liquid composition form.

According to the present disclosure, the silicone-based coating composition includes an organic solvent; a silicone-based resin; a silicone-based crosslinking agent; a metal catalyst; and the silicone-based compound represented by Chemical Formula 1, and may include the silicone-based compound represented by Chemical Formula 1 in greater than or equal to 4 parts by weight and less than or equal to 60 parts by weight with respect to 100 parts by weight of the organic solvent.

According to the present disclosure, the silicone-based coating composition may include the silicone-based resin in 5 parts by weight to 30 parts by weight; the silicone-based crosslinking agent in 0.05 parts by weight to 5 parts by weight; the metal catalyst in 0.5 parts by weight to 10 parts by weight; and the silicone-based compound represented by Chemical Formula 1 in 4 parts by weight to 60 parts by weight, with respect to 100 parts by weight of the organic solvent.

According to the present disclosure, the organic solvent may be at least one of dimethylacetamide (DMAC), dimethylformamide (DMF), dimethyl sulfoxide (DMSO), tetrahydrofuran (THF) and acetone. However, the organic solvent is not limited thereto, and may be freely selected among organic solvents generally known in the art.

According to the present disclosure, the content of the silicone-based resin may be greater than or equal to 5 parts by weight and less than or equal to 30 parts by weight with respect to 100 parts by weight of the organic solvent. Specifically, the content of the silicone-based resin may be greater than or equal to 5.5 parts by weight and less than or equal to 25.5 parts by weight, greater than or equal to 6.5 parts by weight and less than or equal to 21.5 parts by weight, or greater than or equal to 7.5 parts by weight and less than or equal to 18.5 parts by weight with respect to 100 parts by weight of the organic solvent. By adjusting the content of the silicone-based resin to the above-described range, the silicone-based coating composition may be more readily cured.

According to the present disclosure, the content of the silicone-based crosslinking agent may be greater than or equal to 0.05 parts by weight and less than or equal to 5 parts by weight with respect to 100 parts by weight of the organic solvent. Specifically, the content of the silicone-based crosslinking agent may be greater than or equal to 0.1 parts by weight and less than or equal to 3 parts by weight, greater than or equal to 0.5 parts by weight and less than or equal to 2 parts by weight, or greater than or equal to 0.8 parts by weight and less than or equal to 1.5 parts by weight with respect to 100 parts by weight of the organic solvent. Adjusting the content of the silicone-based crosslinking agent to the above-described range may effectively prevent release peel strength of the coating layer from excessively increasing. Specifically, when the content of the silicone-based crosslinking agent is within the above-described range, release peel strength of the coating layer may be suppressed from greatly increasing even when storing the silicone-based release film for a long period of time under a high temperature condition. In addition, durability of the silicone-based release film including a cured material of the silicone-based coating composition may be enhanced.

According to the present disclosure, the content of the metal catalyst may be greater than or equal to 0.5 parts by weight and less than or equal to 10 parts by weight with respect to 100 parts by weight of the organic solvent. Specifically, the content of the metal catalyst may be greater than or equal to 1 parts by weight and less than or equal to 8 parts by weight, greater than or equal to 1.5 parts by weight and less than or equal to 7 parts by weight, or greater than or equal to 2 parts by weight and less than or equal to 4 parts by weight with respect to 100 parts by weight of the organic solvent. Specifically, the metal catalyst performs a role of facilitating a curing reaction of the silicone-based resin and the silicone-based crosslinking agent, and adjusting the content of the metal catalyst to the above-described range may effectively suppress the silicone-based coating composition from being uncured or overcured.

According to the present disclosure, the content of the silicone-based compound represented by Chemical Formula 1 may be greater than or equal to 0.1 parts by weight and less than or equal to 80 parts by weight with respect to 100 parts by weight of the organic solvent. Specifically, the content of the silicone-based compound represented by Chemical Formula 1 may be greater than or equal to 0.3 parts by weight and less than or equal to 70 parts by weight, greater than or equal to 0.5 parts by weight and less than or equal to 60 parts by weight, greater than or equal to 1 parts by weight and less than or equal to 60 parts by weight, greater than or equal to 4 parts by weight and less than or equal to 60 parts by weight, greater than or equal to 1 parts by weight and less than or equal to 50 parts by weight, greater than or equal to 4 parts by weight and less than or equal to 50 parts by weight, greater than or equal to 4 parts by weight and less than or equal to 40 parts by weight, greater than or equal to 4 parts by weight and less than or equal to 25 parts by weight, or greater than or equal to 15 parts by weight and less than or equal to 25 parts by weight with respect to 100 parts by weight of the organic solvent. Specifically, by adjusting the content of the silicone-based compound represented by Chemical Formula 1 to the above-described range, the composition may lower release peel strength by lowering crosslink density of a coating layer and thereby maximizing flexibility of the coating layer, and may be free from silicone transfer and blocking problems.

According to the present disclosure, the silicone-based compound represented by Chemical Formula 1 may have a weight average molecular weight of greater than or equal to 25,000 g/mol and less than or equal to 70,000 g/mol. Specifically, the silicone-based compound represented by Chemical Formula 1 may have a weight average molecular weight of greater than or equal to 30,000 g/mol and less than or equal to 70,000 g/mol, greater than or equal to 40,000 g/mol and less than or equal to 70,000 g/mol, or greater than or equal to 50,000 g/mol and less than or equal to 70,000 g/mol. By adjusting the weight average molecular weight of the silicone-based compound represented by Chemical Formula 1 to the above-described range, a release film in which a coating layer including a cured material of the silicone-based coating composition has a low release peel strength value and a change in the release peel strength is small may be obtained.

According to the present disclosure, $R_1$ to $R_3$ of the silicone-based compound represented by Chemical Formula 1 are each independently hydrogen or a substituted or unsubstituted alkyl group, and n may be an integer of 10 to 1000.

More specifically, the silicone-based compound represented by Chemical Formula 1 may be represented by the following Chemical Formula 2.

[Chemical Formula 2]

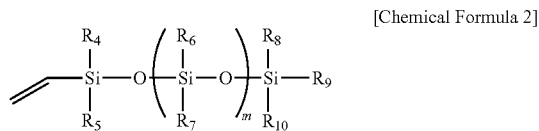

$R_4$ to $R_{10}$ are each independently hydrogen, a substituted or unsubstituted alkyl group or a substituted or unsubstituted cycloalkyl group, and m is an integer of 1 to 1500.

According to the present disclosure, $R_4$ to $R_{10}$ of the silicone-based compound represented by Chemical Formula 2 are each independently hydrogen or a substituted or unsubstituted alkyl group, and m may be an integer of 10 to 1000.

More specifically, the silicone-based compound represented by Chemical Formula 2 may be a compound of the following Chemical Formula 2-1.

[Chemical Formula 2-1]

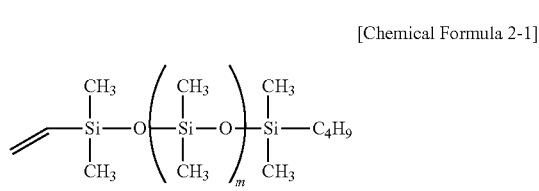

In Chemical Formula 2-1, m is an integer of 600 to 1000.

According to the present disclosure, the silicone-based coating composition may have a solid content of greater than or equal to 0.5 weight % and less than or equal to 30 weight %. Specifically, the silicone-based coating composition may have a solid content of greater than or equal to 1 weight % and less than or equal to 25 weight %, greater than or equal to 5 weight % and less than or equal to 20 weight %, greater than or equal to 10 weight % and less than or equal to 15 weight %, greater than or equal to 1 weight % and less than or equal to 5 weight %, greater than or equal to 8 weight % and less than or equal to 15 weight %, or greater than or equal to 20 weight % and less than or equal to 28 weight %.

According to the present disclosure, the silicone-based coating composition may be readily coated by adjusting the solid content of the silicone-based coating composition to the above-described range. In addition, a sudden increase in viscosity may be prevented when curing the silicone-based coating composition, and accordingly, a decrease in wettability during the coating may be prevented. Specifically, when the solid content of the silicone-based coating composition is within the above-described range, the content of the silicone-based resin included in the silicone-based coating composition is relatively small, which may prevent a decrease in durability of the cured material of the silicone-based coating composition. In addition, a decrease in surface flatness of the cured material caused by a sudden increase in viscosity when curing the silicone-based coating composition may be effectively suppressed.

According to the present disclosure, the silicone-based coating composition may include other additives including at least one of a release agent, silica particles and a photoinitiator. However, types of the other additives are not limited, and known constitutions used in the art may be used.

According to one embodiment of the present disclosure, the silicone-based coating composition may be cured through photocuring or thermal curing. Specifically, the silicone-based coating composition may be thermally cured, and thermal curing of the silicone-based coating composition may be conducted for a time of longer than or equal to 30 seconds and shorter than or equal to 180 seconds at a temperature of higher than or equal to 100° C. and lower than or equal to 180° C. By adjusting the curing temperature and the curing time of the silicone-based coating composition to the above-described ranges, the silicone-based coating composition may be stably cured, and the cured material may have enhanced durability.

Silicone-Based Release Film

One embodiment of the present disclosure provides a silicone-based release film including a base layer; and a coating layer that is a cured material of the silicone-based coating composition.

The silicone-based release film according to the present disclosure is capable of lowering release peel strength by lowering crosslink density of the coating layer and thereby maximizing flexibility of the coating layer, and has an advantage of being free from silicone transfer and blocking problems.

According to the present disclosure, the silicone-based release film includes a base layer and a coating layer, and the coating layer may include a cured material of the silicone-based coating composition.

According to the present disclosure, by coating and curing the silicone-based coating composition on one surface of the base layer, a silicone-based release film including the coating layer provided on one surface of the base layer may be provided. As a method of coating the silicone-based coating composition on one surface of the base, known processes may be used. Specifically, an inkjet printing process, a dispensing process, a silk screen process, a spray coating process, a spin coating process, a knife coating process, a dip coater coating process, a Mayer bar coating process, a gravure coating process, a micro gravure coating process and the like may be used.

According to the present disclosure, the base layer may include at least one of a polyethylene resin, a polyethylene terephthalate resin, a polyether ether ketone resin, a polyimide resin, a polypropylene resin, an elongated polypropylene resin, cellulose and a polyvinyl chloride resin, however, types of the base layer are not limited.

According to the present disclosure, the base layer may have a thickness of greater than or equal to 10 μm and less than or equal to 500 μm. The silicone-based release film including the base layer having a thickness in the above-described range may have excellent durability.

According to the present disclosure, the coating layer may have a thickness of greater than or equal to 30 nm and less than or equal to 500 nm.

According to one embodiment of the present disclosure, the coating layer may satisfy an amount of change in the release peel strength according to the following Equation 1.

$$5\% \leq (X-Y)/X \times 100 \leq 70\%$$ [Equation 1]

In Equation 1, X is release peel strength of the coating layer after attaching the coating layer to a Tesa7475 standard adhesive tape and storing for 1 day at room temperature (25° C.) (initial release peel strength), and Y means release peel strength of the coating layer after attaching the coating layer to a Tesa7475 standard adhesive tape and storing for 1 day at 70° C. (release peel strength after heat treatment).

In other words, with respect to the release peel strength of the coating layer after attaching the coating layer to a Tesa7475 standard adhesive tape and storing for 1 day at room temperature (25° C.) (initial release peel strength), an amount of change in the release peel strength of the coating layer after storing for 1 day at 70° C. (release peel strength after heat treatment) may be greater than or equal to 5% and less than or equal to 70%. Specifically, an amount of change in the release peel strength after heat treatment with respect to the initial release peel strength may be greater than or equal to 5% and less than or equal to 65%, or greater than or equal to 5% and less than or equal to 63%. Release peel strength including the coating layer in which the amount of change in the release peel strength after heat treatment with respect to the initial release peel strength satisfies the above-described range has an advantage of maintaining release performance at a proper level even under a high temperature condition. In other words, the silicone-based release film may be exposed to various conditions after provided in an actual product, and particularly, the silicone-based release film may have a proper level of release performance even when exposed to a high temperature condition.

According to the present disclosure, release peel strength of the coating layer may be measured at a peel angle of 180° and a peel rate of 0.3 m/min under a 50 RH % humidity condition after attaching the coating layer to a Tesa7475 standard adhesive tape, and storing the silicone-based release film for a set time at a set temperature.

According to the present disclosure, release peel strength of the coating layer after attaching the coating layer to a Tesa7475 standard adhesive tape and storing for 1 day at room temperature (25° C.) may be greater than or equal to 0.3 gf/in and less than or equal to 15 gf/in, and specifically, the release peel strength may be greater than or equal to 0.4 gf/in and less than or equal to 9.1 gf/in, greater than or equal to 0.45 gf/in and less than or equal to 6.0 gf/in, or greater than or equal to 0.45 gf/in and less than or equal to 1.0 gf/in. The silicone-based release film including the coating layer having release peel strength after storing for 1 day at room temperature (25° C.) satisfying the above-described range may have a small change in the release peel strength.

According to the present disclosure, release peel strength of the coating layer after attaching the coating layer to a Tesa7475 standard adhesive tape and storing for 1 day at 70° C. may be greater than or equal to 0.5 gf/in and less than or equal to 15 gf/in, and specifically, the release peel strength may be greater than or equal to 0.5 gf/in and less than or equal to 11.2 gf/in, greater than or equal to 0.55 gf/in and less than or equal to 7.0 gf/in, or greater than or equal to 0.55 gf/in and less than or equal to 1.0 gf/in. The silicone-based release film including the coating layer having release peel strength after storing for 1 day at 70° C. satisfying the above-described range has an advantage of obtaining superior release performance even under a high temperature condition.

In addition, as each of the values of release peel strength of the coating layer after storing for 1 day at room temperature (25° C.) and release peel strength of the coating layer after storing for 1 day at 70° C. is smaller, there is an advantage of obtaining superior release performance for a silicone-based release film using the same.

According to one embodiment of the present disclosure, the coating layer may satisfy a residual adhesive rate according to the following Equation 2.

Residual adhesive rate (%)=(peel strength of standard tape attached to SUS plate after attached to release film/peel strength of standard tape directly attached to SUS plate without any treatment)×100(%) [Equation 2]

In other words, the residual adhesive rate obtained by peel strength of a standard tape attached directly to a SUS plate without any treatment with respect to peel strength of a standard tape attached to the SUS plate after attached to a release film may be greater than or equal to 85% and less than or equal to 99.9%, and preferably greater than or equal to 95% and less than or equal to 99.9%.

When satisfying the residual adhesive rate, there is an advantage of obtaining a silicone-based release film having superior release performance.

According to one embodiment of the present disclosure, the coating layer has adhesion to a base of 6 days or longer. The adhesion to a base means durability of the release layer, which is advantageous as the days are longer, and having the adhesion to a base of 6 days or longer is advantageous of obtaining a silicone-based release film with excellent durability.

Hereinafter, the present disclosure will be described in detail with reference to examples in order to specifically describe the present disclosure. However, examples according to the present disclosure may be modified to various different forms, and the scope of the present disclosure is not construed as being limited to the examples described below. Examples of the present specification are provided in order to more fully describe the present disclosure to those having average knowledge in the art.

1. Example and Comparative Example: Preparation of Silicone-Based Release Film

1) Material Preparation

Vinyl terminated polydimethylsiloxane (Shin-Etsu Silicone/KS-847H) having a weight average molecular weight of 300,000 g/mol to 400,000 g/mol and poly dispersity index of 1.8 to 2.2 as a silicone-based resin, a silicone-based crosslinking agent (Shin-Etsu Silicone/X-92-122), a platinum-based catalyst (Shin-Etsu Silicone/PL-50T), a silicone-based compound represented by Chemical Formula 2-1 (Gelest Inc./MCSV212, MCR-V21, MCR-V25 and MCR-V41), and tetrahydrofuran (THF) as organic solvent (solvent) were prepared.

Using the materials prepared as above, silicone-based release films of the following Examples 1 to 5 and Comparative Examples 1 to 10 were prepared.

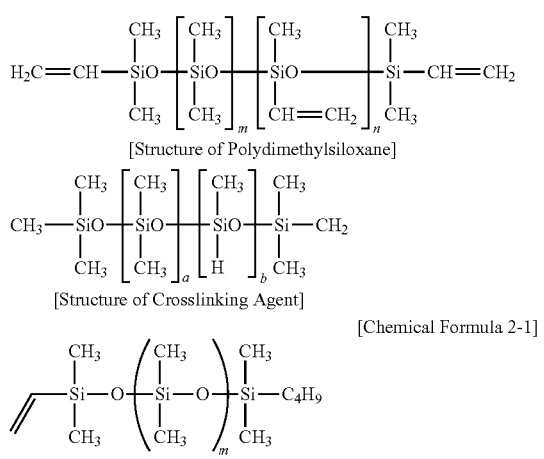

[Structure of Polydimethylsiloxane]

[Structure of Crosslinking Agent]

[Chemical Formula 2-1]

(MCS-V212 is a case in which m is an integer of 10 to 20 in Chemical Formula 2-1, and MCS-V212 has a weight average molecular weight of 1,200 g/mol to 1,400 g/mol and poly dispersity index of 1.5 to 2.0, MCR-V21 is a case in which m is an integer of 60 to 100 in Chemical Formula 2-1, and MCR-V21 has a weight average molecular weight of 5,500 g/mol to 6,500 g/mol and poly dispersity index of 1.5 to 2.0, MCR-V25 is a case in which m is an integer of 100 to 500 in Chemical Formula 2-1, and MCR-V25 has a weight average molecular weight of 15,000 g/mol to 20,000 g/mol and poly dispersity index of 1.5 to 2.0, and MCR-V41 is a case in which m is an integer of 600 to 1000 in Chemical Formula 2-1, and MCR-V41 has a weight average molecular weight of 55,000 g/mol to 65,000 g/mol and poly dispersity index of 1.5 to 2.0.)

2) Comparative Example 1

A silicone-based coating composition including, with respect to 100 parts by weight of tetrahydrofuran (THF), 10 parts by weight of a silicone-based resin, 1 parts by weight of a silicone-based crosslinking agent, 3 parts by weight of a platinum-based catalyst and 1 parts by weight of a silicone-based compound (MCRV41) was prepared.

After that, the prepared silicone-based coating composition was coated to a thickness of 2.5 g/m² on a polyethylene terephthalate (PET, MCC/T10075S) base layer having a thickness of 75 μm using a Mayer bar No. 8. After that, the silicone-based coating composition coated on the base was dried and cured for 1 minute at 130° C., and then aged for 24 hours at 50° C. to prepare a silicone-based release film.

3) Examples 1 to 5 and Comparative Examples 2 to 10

Silicone-based release films of Examples 1 to 5 and Comparative Examples 2 to 10 were each prepared in the same manner as in Comparative Example 1 except that the silicone-based coating composition was prepared by changing the type and the content of the silicone-based coating composition of Comparative Example 1 as in the following Table 1 and Table 2.

The numbers described in the following Table 1 and Table 2 each mean the content of the material included in the silicone-based coating composition, and mean parts by weight of the material included in the composition with respect to 100 parts by weight of tetrahydrofuran (THF) that is the organic solvent. For example, Example 1 of the following Table 1 means that the silicone-based resin is in 10 parts by weight with respect to 100 parts by weight of tetrahydrofuran (THF).

TABLE 1

| | Comparative Example 1 | Comparative Example 2 | Example 1 | Example 2 | Example 3 | Example 4 | Example 5 | Comparative Example 3 |
|---|---|---|---|---|---|---|---|---|
| Organic Solvent (THF) | 100 | 100 | 100 | 100 | 100 | 100 | 100 | 100 |
| Silicone-Based Resin (KS-847H) | 10 | 10 | 10 | 10 | 10 | 10 | 10 | 10 |
| Silicone-Based Compound | 1 (MCR-V41) | 3 (MCR-V41) | 5 (MCR-V41) | 10 (MCR-V41) | 20 (MCR-V41) | 30 (MCR-V41) | 50 (MCR-V41) | 70 (MCR-V41) |
| Silicone-Based Crosslinking Agent (X-92-122) | 1 | 1 | 1 | 1 | 1 | 1 | 1 | 1 |
| Platinum-Based Catalyst (PL-50T) | 3 | 3 | 3 | 3 | 3 | 3 | 3 | 3 |

TABLE 2

| | Comparative Example 4 | Comparative Example 5 | Comparative Example 6 | Comparative Example 7 | Comparative Example 8 | Comparative Example 9 | Comparative Example 10 |
|---|---|---|---|---|---|---|---|
| Organic Solvent (THF) | 100 | 100 | 100 | 100 | 100 | 100 | 100 |
| Silicone-Based Resin (KS-847H) | 10 | 10 | 10 | 10 | 10 | 10 | 10 |
| Silicone-Based Compound | — | 20 (MCR-V212) | 50 (MCR-V212) | 20 (MCR-V21) | 50 (MCR-V21) | 20 (MCR-V25) | 50 (MCR-V25) |
| Silicone-Based Crosslinking Agent (X-92-122) | 1 | 1 | 1 | 1 | 1 | 1 | 1 |
| Platinum-Based Catalyst (PL-50T) | 3 | 3 | 3 | 3 | 3 | 3 | 3 |

Comparative Example 4 of Table 2 means that the silicone-based coating composition does not include the silicone-based compound.

4) Comparative Example 11

A silicone-based release film (COSMO AM&T CO., LTD/LL01) was used.

5) Comparative Example 12

A silicone-based release film (OSUNGRF CO., LTD./SUL03) was used.

2. Measurement Method

For the films prepared in the examples and the comparative examples, physical properties were measured as follows.

1) Measurement of Release Peel Strength

Release peel strength of each of the release films prepared in Example 1 to Example 5 and Comparative Example 1 to Comparative Example 12 was measured as follows.

The coating layer of the release film was attached to a Tesa7475 standard adhesive tape by pressing back and forth 3 times with a load of 2 kg, stored for 1 day under the atmosphere of 25° C. and 50 RH %, and release peel strength was measured using a measurement device (Cheminstruments, Inc./AR-1000) under the atmosphere of 25° C. and 50 RH %. For the sample size of 50 mm×1,500 mm and the peel strength measurement size of 250 mm×1, 500 mm, the measurement was made at a peel angle of 180° and a peel rate of 0.3 m/min, and an average value of 5 repeated measurements was obtained to obtain the release peel strength (gf/in).

In addition, the coating layer of the silicone-based release film was attached to a Tesa7475 standard adhesive tape by pressing back and forth 3 times with a load of 2 kg, stored for 1 day under the atmosphere of 70° C. and 50 RH %, and release peel strength was measured using a measurement device (Cheminstruments, Inc./AR-1000) under the atmosphere of 25° C. and 50 RH %. For the sample size of 50 mm×1,500 mm and the peel strength measurement size of 250 mm×1,500 mm, the measurement was made at a peel angle of 180° and a peel rate of 0.3 m/min, and an average value of 5 repeated measurements was obtained to obtain the release peel strength (gf/in).

The release peel strength of the coating layer after storing for 1 day at 25° C. (initial release peel strength) measured through the above-described method, the release peel strength of the coating layer after storing for 1 day at 70° C. (release peel strength after heat treatment), and an amount of change in the release peel strength after heat treatment with respect to the initial release peel strength are shown in the following Table 3 and Table 4.

TABLE 3

|  |  | Comparative Example 1 | Comparative Example 2 | Example 1 | Example 2 | Example 3 | Example 4 | Example 5 | Comparative Example 3 |
|---|---|---|---|---|---|---|---|---|---|
| Release Peel Strength (gf/in) | Room Temperature*1 Day | 9.1 | 7.1 | 5.8 | 2.1 | 0.5 | 0.6 | 0.5 | — |
|  | 70° C.*1 Day | 11.2 | 8.8 | 6.1 | 2.8 | 0.8 | 0.7 | 0.6 | — |
| Amount of Change in Release Peel Strength (%) |  | 23 | 24 | 5 | 33 | 60 | 17 | 20 | — |

TABLE 4

|  |  | Comparative Example 4 | Comparative Example 5 | Comparative Example 6 | Comparative Example 7 | Comparative Example 8 | Comparative Example 9 | Comparative Example 10 | Comparative Example 11 | Comparative Example 12 |
|---|---|---|---|---|---|---|---|---|---|---|
| Release Peel Strength (gf/in) | Room Temperature*1 Day | 9.7 | 9.2 | 8.5 | 8.8 | 6.3 | 6.8 | 5.7 | 8.8 | 1.9 |
|  | 70° C.*1 Day | 13.5 | 12.4 | 9.6 | 11.8 | 8.1 | 8.1 | 7.1 | 11.7 | 2.3 |
| Amount of Change in Release Peel Strength (%) |  | 39 | 35 | 13 | 34 | 29 | 19 | 25 | 33 | 21 |

The amount of change in the release peel strength may be calculated using the following Equation 1.

Amount of change in release peel strength (%)=|(X−Y)/X|×100(%)  [Equation 1]

In Equation 1, X is release peel strength of the coating layer after storing for 1 day at room temperature (25° C.) (initial release peel strength), and Y means release peel strength of the coating layer after storing for 1 day at 70° C. (release peel strength after heat treatment).

In Comparative Example 3 of Table 3, the silicone-based coating composition was not cured, and the release film was not able to be prepared, and accordingly, the peel strength was not able to be measured.

2) Measurement of Residual Adhesive Rate

Each of the release films of Example 1 to Example 5 and Comparative Example 1 to Comparative Example 12 was brought into contact with an adhesive, and whether a portion of the release film was transferred to the adhesive causing a decrease in the adhesive strength of the adhesive was measured.

Two standard tapes were prepared. One of the standard tapes was attached to a SUS plate. The other standard tape was attached to the silicone-based release film of each of Example 1 to Example 5 and Comparative Example 1 to Comparative Example 12, removed after storing for 20 hours, and the removed standard tape was attached to the SUS plate.

Peel strength of each of the standard tapes attached to the SUS plate was measured, and from a ratio (%) of the peel strength of the standard tape attached to the SUS plate after attached to the release film of each of the examples and the comparative examples with respect to the peel strength of the standard tape attached directly to the SUS plate without any treatment, a residual adhesive rate was evaluated. The following Equation 2 is an equation representing the residual adhesive rate (%).

Residual adhesive rate (%)=(peel strength of standard tape attached to SUS plate after attached to release film/peel strength of standard tape directly attached to SUS plate without any treatment)×100(%)     [Equation 2]

It was indicated as very excellent when the residual adhesive rate was 95% or greater, excellent when greater than or equal to 90% and less than 95%, average when greater than or equal to 80% and less than 90%, and poor when less than 80%, and the results are shown in the following Table 5 and Table 6.

TABLE 5

|  | Comparative Example 1 | Comparative Example 2 | Example 1 | Example 2 | Example 3 | Example 4 | Example 5 | Comparative Example 3 |
|---|---|---|---|---|---|---|---|---|
| Residual Adhesive Rate (%) | 98.5 | 96.4 | 97.7 | 98.8 | 96.5 | 95.4 | 96.6 | — |
| Evaluation of Residual Adhesive Rate | Very Excellent | Very Excellent | Very Excellent | Very Excellent | Very Excellent | Very Excellent | Very Excellent | — |

TABLE 6

|  | Comparative Example 4 | Comparative Example 5 | Comparative Example 6 | Comparative Example 7 | Comparative Example 8 | Comparative Example 9 | Comparative Example 10 | Comparative Example 11 | Comparative Example 12 |
|---|---|---|---|---|---|---|---|---|---|
| Residual Adhesive Rate (%) | 99.5 | 96.5 | 91.1 | 97.3 | 93.3 | 96.1 | 97.6 | 97.8 | 81.1 |
| Evaluation of Residual Adhesive Rate | Very Excellent | Very Excellent | Excellent | Very Excellent | Excellent | Very Excellent | Very Excellent | Very Excellent | Average |

In Comparative Example 3 of Table 5, the silicone-based coating composition was not cured, and the release film was not able to be prepared, and accordingly, the residual adhesive rate was not able to be measured.

3) Measurement of Adhesion to Base

Adhesion to a base of each of the release films prepared in Example 1 to Example 5 and Comparative Example 1 to Comparative Example 12 was measured as follows. After leaving the release film unattended by a certain period of time at room temperature (20° C., 40% RH), the corresponding release film went back and forth three times in a friction resistance tester with toluene, an organic solvent, applied on a gauze, and the period of time when the coating layer was eliminated was measured. The degree of adhesion to a base measured using the above-described method is described in the following Table 7 and Table 8.

TABLE 7

|  | Comparative Example 1 | Comparative Example 2 | Example 1 | Example 2 | Example 3 | Example 4 | Example 5 | Comparative Example 3 |
|---|---|---|---|---|---|---|---|---|
| Adhesion to Base | 13 Days | 14 Days | 12 Days | 14 Days | 12 Days | 8 Days | 6 Days | — |

TABLE 8

| | Comparative Example 4 | Comparative Example 5 | Comparative Example 6 | Comparative Example 7 | Comparative Example 8 | Comparative Example 9 | Comparative Example 10 | Comparative Example 11 | Comparative Example 12 |
|---|---|---|---|---|---|---|---|---|---|
| Adhesion to Base | 15 Days | 10 Days | 4 Days | 11 Days | 5 Days | 10 Days | 9 Days | 10 Days | 2 Days |

In Comparative Example 3 of Table 7, the silicone-based coating composition was not cured, and the release film was not able to be prepared, and accordingly, the adhesion to a base was not able to be measured.

As seen from Table 1 to Table 8, it was identified that the release film using the silicone-based coating composition of the present disclosure had a size of low release peel strength, a small amount of change in the release peel strength, a very superior residual adhesive rate, and adhesion to a base of 6 days or longer. In other words, a release film with low silicone transfer and blocking problems, and with excellent durability was able to be prepared.

On the other hand, it was identified that Comparative Examples 1 and 2 had a size of relatively high release peel strength, and were more likely to have silicone transfer and blocking problems compared to the release film using the silicone-based coating composition of the present disclosure.

In addition, it was identified that the silicone-based coating composition was not cured in Comparative Example 3, and Comparative Examples 4 to 12 had a size of relatively high release peel strength, a relatively inferior residual adhesive rate, or unfavorable adhesion to a base. In other words, it was identified that Comparative Examples 4 to 12 were also more likely to have silicone transfer and blocking problems compared to the release film using the silicone-based coating composition of the present disclosure, or had unfavorable durability.

The invention claimed is:

1. A silicone-based coating composition comprising:
   a silicone-based resin;
   a silicone-based crosslinking agent; and
   a metal catalyst, and further comprising,
   a silicone-based compound represented by Chemical Formula 2 having a weight average molecular weight of greater than or equal to 25,000 g/mol and less than or equal to 70,000 g/mol:

[Chemical Formula 2]

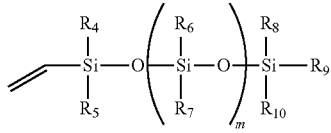

wherein, in Chemical Formula 2,
$R_4$ to $R_{10}$ are each independently hydrogen, a substituted or unsubstituted alkyl group or a substituted or unsubstituted cycloalkyl group; and
m is an integer of 1 to 1500.

2. The silicone-based coating composition of claim 1, wherein the silicone-based resin is vinyl terminated polydimethylsiloxane.

3. The silicone-based coating composition of claim 1, wherein $R_4$ to $R_{10}$ are each independently hydrogen or a substituted or unsubstituted alkyl group; and
m is an integer of 10 to 1000.

4. The silicone-based coating composition of claim 1, which has a form of a liquid composition.

5. The silicone-based coating composition of claim 1, further comprising:
   an organic solvent;
   wherein the silicone-based compound is included in greater than or equal to 4 parts by weight and less than or equal to 60 parts by weight with respect to 100 parts by weight of the organic solvent.

6. The silicone-based coating composition of claim 5, wherein:
   the silicone-based resin is included in 5 parts by weight to 30 parts by weight;
   the silicone-based crosslinking agent is included in 0.05 parts by weight to 5 parts by weight;
   the metal catalyst is included in 0.5 parts by weight to 10 parts by weight; and
   the silicone-based compound is included in 4 parts by weight to 60 parts by weight,
   with respect to 100 parts by weight of the organic solvent.

7. The silicone-based coating composition of claim 5, wherein the organic solvent is any one of dimethylacetamide (DMAC), dimethylformamide (DMF), dimethyl sulfoxide (DMSO), tetrahydrofuran (THF) or acetone.

8. A silicone-based release film comprising:
   a base layer; and
   a coating layer that is a cured material of the silicone-based coating composition of claim 1.

9. The silicone-based release film of claim 8, wherein the coating layer has a thickness of 30 nm to 500 nm.

10. The silicone-based release film of claim 8, wherein the base layer has a thickness of 10 μm to 500 μm.

11. The silicone-based release film of claim 8, wherein the base layer includes one of a polyethylene resin, a polyethylene terephthalate resin, polyether ether ketone, paper or combinations thereof.

12. The silicone-based coating composition of claim 1, wherein the silicone-based resin has a poly dispersity index (PDI) of 1 to 3.

13. The silicone-based coating composition of claim 1, wherein the silicone-based resin has a weight average molecular weight of greater than or equal to 100,000 g/mol and less than or equal to 600,000 g/mol.

14. The silicone-based coating composition of claim 1, wherein the metal catalyst comprises a platinum-based catalyst.

15. The silicone-based coating composition of claim 1, wherein the silicone-based compound is represented by Chemical Formula 2-1,

[Chemical Formula 2-1]
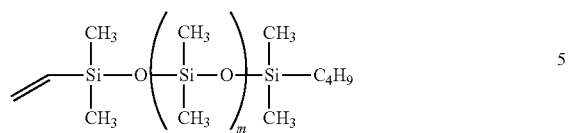
wherein m is an integer of 600 to 1000.